Figure 1:
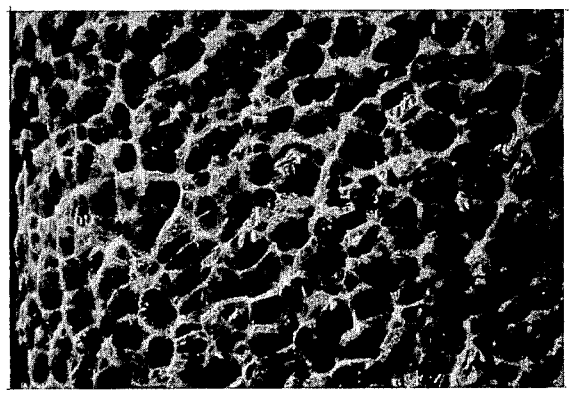

United States Patent [19]

Kuhnel et al.

[11] 4,163,085

[45] Jul. 31, 1979

[54] PROCESS FOR THE PRODUCTION OF POLYOLEFIN FOAM SHEETS CONTAINING PORE REGULATORS

[75] Inventors: Werner Kühnel, Neunkirchen; Paul Spielau, Troisdorf-Eschmar, both of Fed. Rep. of Germany

[73] Assignee: Dynamit Nobel AG, Fed. Rep. of Germany

[21] Appl. No.: 726,604

[22] Filed: Sep. 27, 1976

[30] Foreign Application Priority Data

Sep. 27, 1975 [DE] Fed. Rep. of Germany ....... 2543248

[51] Int. Cl.² ................................................. C08J 9/00
[52] U.S. Cl. .......................................... 521/96; 521/97; 521/138; 521/143; 521/144; 521/189
[58] Field of Search .......... 260/2.5 HA, 2.5 N, 2.5 E, 260/873; 521/96, 77, 143, 97

[56] References Cited

U.S. PATENT DOCUMENTS

| | | | |
|---|---|---|---|
| 3,306,875 | 2/1967 | Hay | 528/215 |
| 3,927,159 | 12/1975 | Tomikawa | 260/2.5 HA |
| 3,965,054 | 6/1976 | Nojiri et al. | 260/2.5 HA |
| 3,966,651 | 6/1976 | Kleiner et al. | 260/2.5 HA |

*Primary Examiner*—Harold D. Anderson
*Attorney, Agent, or Firm*—Craig and Antonelli

[57] ABSTRACT

A process for producing a continuous foam sheet of a synthetic resin having a polyolefin base which comprises admixing an organic peroxide, a blowing agent, and a pore regulator with the synthetic resin, finely distributing said peroxide, blowing agent and pore regulator within said resin at a temperature below the decomposition temperature of the peroxide and the blowing agent in the thermoplastic range, shaping the resulting admixture into a sheet or panel and thereafter effecting thermal crosslinking and foaming of the resin. The pore regulator comprises an oligomeric and/or polymeric saturated dicarboxylic acid ester or a mixture of such esters having average molecular weights of from between 500 and 40,000, and flow points and/or melting ranges that are below the decomposition temperature of the peroxide and of the blowing agent.

24 Claims, 6 Drawing Figures

FOAM (A)

FOAM (B)

FOAM (C)

FOAM (B)

FOAM (D)

FOAM (E)

PROCESS FOR THE PRODUCTION OF POLYOLEFIN FOAM SHEETS CONTAINING PORE REGULATORS

The present invention relates to a process for the production of a continuous foam sheet by the thermal cross-linking and foaming of a synthetic resin of polyolefin that is shaped into a sheet or panel and that contains an organic peroxide, a blowing agent, as well as optionally customary additives in a homogeneous distribution.

A process is known from DAS 1,694,130 for the production of a continuous foam sheet made of polyolefin by homogeneously mixing a polyolefin or a mixture of a polyolefin with rubber and/or synthetic resins with an organic peroxide, a blowing agent, and optionally customary additives, shaping of the thus-obtained mixture into a sheet, and thermal crosslinking and foaming of the synthetic resin. In this method, the sheet is first shaped at temperatures of below the decomposition temperature of the organic peroxide and of the blowing agent, and the thus-produced, shaped sheet is further heated for purposes of crosslinking and foaming so that both sides of the sheet, carried by an endless conveyor belt made of wire mesh, are heated to substantially the same extent.

A preferred blowing agent is one having a decomposition temperature higher than that of the organic peroxide.

In this process the pore size of the polyolefin foam, which is being produced, is affected by the amount of crosslinking agent, the type and quantity of the blowing agent, the thickness of the thus-prepared foam, and by the temperatures employed in the expansion tunnel formed within the belt conveyor.

Taking all aforementioned measures into account, however, it is practically impossible to reach a further reduction in the cell size.

It is likewise impossible, as demonstrated by experiments, to refine the cellular structure by the addition of customary nucleating agents, such as, for example citric acid or sodium bicarbonate, which are conventional in the manufacture of other foam materials.

It has been found surprisingly that a marked reduction in cell size can be attained by the use, as pore regulators, of certain saturated polyesters, namely, oligomeric and/or polymeric saturated dicarboxylic acid esters from one or more dicarboxylic acids and one or more diols, or mixtures of these esters.

The process of this invention comprises adding to and finely distributing the pore regulators in the mixture to be shaped at below the decomposition temperature of the peroxide and of the blowing agent; pore regulators comprising oligomeric and/or polymeric saturated dicarboxylic acid esters and/or dicarboxylic acid ester mixtures having average molecular weights of between 500 and 40,000, preferably 1,000 and 25,000 and flow points and/or melting ranges at below the decomposition temperature of the peroxide and of the blowing agent. The flow points are measured in accordance with ASTM D 36, and the melting ranges are measured according to the DSC method (differential scanning calorimetry). Generally the decomposition temperatures of the peroxide and of the blowing agent are within the range of from 100° to 280° C. preferably from 130°–250° C.

The effect according to this invention is the more surprising inasmuch as the oligomeric and/or polymeric saturated dicarboxlic acid esters or dicarboxylic acid ester mixtures used according to the invention are incompatible with synthetic resins of a polyolefin basis. After compounding the mixture, which is preferably conducted in the melt and below the decomposition temperature of the crosslinking agent utilized and of the blowing agent employed, the dicarboxylic acid esters or dicarboxylic acid ester mixtures used in accordance with the invention are present in a fine, uniform distribution, but in a practically undissolved state.

The dicarboxylic acid esters or dicarboxylic acid ester mixtures utilized in this invention contain, as the acid component, (a) residues of one or more aromatic, optionally substituted dicarboxylic acids and/or the polyester-forming derivatives thereof; (b) in addition to or in place of the dicarboxylic acid residues recited in (a), residues of one or more saturated dicarboxylic acids of the formula —OOC—R—COO— wherein R represents an optionally alkyl-substituted cycloalkylene residue, or an alkylene residue of 2–8 carbon atoms in the chain which optionally has one or more alkyl substituents of 1–3 carbon atoms, and/or residues of the polyester-forming derivatives, and, as the diol component, residues of one or more saturated diols of the formula —O—R—O— wherein R represents an alkylene residue of 2–8 carbon atoms in the chain optionally substituted by one or more cycloalkyl groups or one or more alkyl groups of 1–3 carbon atoms, the main chain being interrupted, if desired by one or more oxygen atoms or by one or more optionally alkyl substituted cycloalkylene groups.

Oligomeric dicarboxylic acid esters in accordance with the invention are those wherein the molecular weights range between 500 and 10,000, preferably between 1,000 and 5,000.

Polymeric dicarboxylic acid esters according to the invention are polyesters having molecular weights of 10,000 to 40,000.

Suitable for purposes of this invention are amorphous polyesters and/or oligomeric dicarboxylic acid esters of the aforementioned molecular weight range with flow points which do not lie above the temperature necessary for the thermoplastic processing of the mixture into a slab. Also partially crystalline or crystalline polyesters or oligomeric dicarboxylic acid esters of the above-mentioned molecular weight range are suitable for the purpose of this invention, wherein the crystallite melting points are not above the temperature required for the thermoplastic processing operation.

The oligomeric and/or polymeric saturated dicarboxylic acid esters or dicarboxylic acid ester mixtures can be incorporated, for example, by means of a co-masticator or by means of an extruder in the thermoplastic range, but below the decomposition temperature of the crosslinking and blowing agents to be introduced simultaneously or in succession.

The pore regulators of this invention can contain carboxy or hydroxy terminal groups, depending on the manner in which they were produced. However, they can also be modified by completely or partially reacting the carboxy and/or hydroxy end groups with monofunctional alcohols and/or monofunctional carboxylic acids.

The novel pore regulators of this invention are employed in amounts of 0.5–25 parts by weight, preferably 1–15 parts by weight, based on 100 parts by weight of the mixture to be shaped into a sheet (mixture=resin and all other ingredients).

Examples for a suitable acid component (a) for the production of the novel pore regulators are phthalic acid, isophthalic acid, terephthalic acid, or naphthalenedicarboxylic acid and the like. Suitable polyester-forming derivatives are, insofar as obtainable, the anhydrides or lower alkyl esters thereof, for example the dimethyl esters, or diphenyl esters, or nuclear-substituted aromatic dicarboxylic acids, such as 3,6-dichlorophthalic acid, tetrachlorophthalic acid, or methyl-, especially monomethylterephhalic acid, and the like, individually or in a mixture with one another.

A preferred acid component (a) is terephthalic acid and/or isophthalic acid and/or phthalic acid or phthalic anhydride, optionally the alkyl esters thereof, in particular the dimethyl esters thereof.

Examples for a suitable acid component (b) are succinic anhydride, dimethylmalonic acid, $\alpha,\alpha'$-dimethylglutaric acid, adipic acid, azelaic acid, sebacic acid, hexahydrophthalic, hexahydroisophthalic, or hexahydro terephthalic acid, as well as mixtures thereof.

In place of the dicarboxylic acids, it is also possible to use the polyester-forming derivatives thereof, for example, as far as obtainable, the anhydrides or lower mono- or diesters thereof. Preferably, adipic acid or azelaic acid or sebacic acid is employed as the dicarboxylic acid component (b).

Examples of the diol component are ethylene glycol, 1,2-propanediol, 1,3-propanediol, 1,2-butanediol, 1,4-butandiol, 2,2-dimethylpropanediol, 2,5-hexanediol, 1,6-hexanediol, 4,4'-dihydroxy-2,2-dicyclohexylpropane, 1,2- or 1,4-cyclohexandiol, dimethylcyclohexanediol, dimethylolcyclohexane, 2,2,4-trimethyl-1,3-pentanediol, diethylene glycol, triethylene glycol, and the like. Preferably employed are butanediols, especially the 1,4-isomer, and/or hexanediols, particularly the 1,6-isomer.

Preferably, no more than three $CH_3$—, $C_2H_5$—, $C_3H_7$— groups are suitable as the alkyl substituents for the diol or acid component. The alkyl substituents can be identical or different from each other and can be arranged symmetrically or asymmetrically on the chain carbon atoms or ring carbon atoms.

In addition to the esters of one dicarboxylic acid and one diol, it is also possible to employ mixed esters from the aforementioned dicarboxylic acids and diols, or also mixtures of different dicarboxylic acid esters, insofar as they meet the above-described requirements with regard to the molecular weights and the flow and melting points, respectively. If desired, insofar as the dicarboxylic acid esters utilized contain hydroxy and/or carboxy end groups, the latter can be reacted with monofunctional carboxylic acids, e.g. a saturated fatty acid, or with a lower or higher alcohol, e.g. lauryl alcohol.

The oligomeric and polymeric saturated dicarboxylic acid esters used in accordance with this invention are produced in a manner known per se by esterification or ester interchange, optionally in the presence of customary catalysts, wherein lower or higher molecular polyesters are obtained, by a suitable choice of the COOH-/OH relationship. (See Ullmann, "Encyclopaedie der technischen Chemie" (Encyclopedia of Technical Chemistry) 14 (1963): 82–86.

The term "synthetic resin of a polyolefin basis" as used herein is understood to mean high-pressure, intermediate-pressure, or low-pressure polyethylene, copolymers consisting essentially of ethylene, as well as mixtures thereof. Such copolymers are, for example, ethylene-propylene copolymers, ethylene-butylene copolymers, copolymers from ethylene and vinyl acetate and the derivatives thereof, copolymers of ethylene and acrylic acid esters or the derivatives thereof, copolymers of ethylene and methacrylic acid or the derivatives thereof, and the like wherein ethylene comprises from 50 to <100 of the monomeric mixture used to form the copolymer. Also, mixtures of the aforementioned polyolefins with elastomers and/or synthetic resins can be processed into fine-pored foam sheets in accordance with this invention. For example, up to 100 parts of at least one elastomer and/or synthetic resin miscible with the polyolefin can be incorporated per 100 parts of polyolefin. Elastomers miscible with polyolefin are, for example, natural rubber, ethylene-propylene elastomer, butyl rubber, polyisobutylene, styrene-butadiene elastomer, polybutadiene, polybutene, and polyisoprene. Synthetic resins miscible with polyolefin are, for example, acrylonitrile-butadiene-styrene resins, polystyrene, polypropylene, chlorinated polyethylene, sulfochlorinated polyethylene and the like.

Suitable crosslinking agents are organic peroxides, such as, for example dicumyl peroxide, 2,5-dimethyl-2,5-di(tert.-butylperoxy) hexane, tert.-butyl hydroperoxide, and the like.

A suitable blowing agent is a compound which liberates gas under heating and wherein the decomposition temperature is higher than that of the organic peroxide employed. Suitable blowing agents are, for example, azodicarbonamide or p,p'-hydroxy-bis(benzenesulfonyl)hydrazide, and the like. The type and amount of the organic peroxide or blowing agent added are to be selected in dependence on the type and amount of the synthetic resin on polyolefin basis to be foamed. Generally, from 0.5 to 35, preferably >1 to 20, parts of the blowing agent and 0.1 to 2, preferably 0.5 to 1.5 parts by weight of the cross-linking agent are used per 100 parts by weight of the resin.

The oligomeric and/or polymeric saturated dicarboxylic acid esters or dicarboxylic acid ester mixtures utilized as the pore regulators according to this invention are especially suitable for the production of continuous foam sheets in accordance with the process described in DAS 1,694,130 wherein the mixture to be expanded and crosslinked is first preformed to a slab and then, in a separate working step, is crosslinked and expanded on a wire mesh support (conveyor belt) under hot-air heating and/or by heating with infrared radiation.

The dicarboxylic acid esters and dicarboxylic acid ester mixtures utilized as pore regulators according to the present invention are to be selected in correspondence with the synthetic resins to be expanded, which are based on a polyolefin, and the utilized organic peroxides and blowing agents. The additives are compounded with the synthetic resin of a polyolefin basis in the thermoplastic range, for example in an extruder. Also the subsequent shaping to a slab is conducted, for example, by means of an extruder in the thermoplastic range.

Examples for customary additives ordinarily employed together with synthetic resins of a polyolefin basis are antioxidants, light protection agents, pigments, fillers, e.g. chalk, flame retardants, antistatic agents, mold release agents, and the like, which can be added to the mixture to be expanded and crosslinked prior to the thermoplastic processing into a slab.

The invention will be expanded in greater detail with reference to the following examples.

EXAMPLE 1

(A)

84 parts by weight of high-pressure polyethylene (melt index about 3.5, measured according to DIN (German Industrial Standard) 53 735,190/2

1 part by weight of dicumyl peroxide 15 parts by weight of azodicarbonamide 3 parts by weight of adipic acid-butylene glycol ester having an average molecular weight of 1,200 (diol component: 1,4-butanediol)

were mixed at room temperature and were processed by means of an extruder at material temperature of about 130° C. into a homogeneous sheet having a thickness of 5.5 mm. The sheet carried by an endless conveyor belt of a rust-proof wire mesh (mesh width 0.5 mm) was crosslinked and foamed by conducting it through an air heated canal of 10 meters length. The temperature program of the canal was 175° C./223° C./215° C. (insertion zone → end zone) and the velocity of conveyor belt was 0.9 m/min. The foam was 18 mm thick.

(B)

For comparison purposes, an expanded sheet was produced as described in (A), but without the addition of adipic acid-butylene glycol ester.

Figure 2:
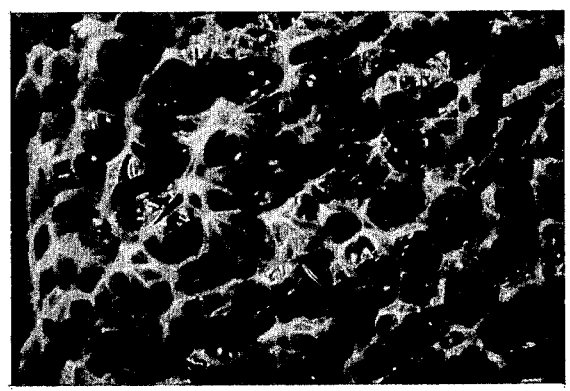

Foam (A) has markedly reduced cells as compared to foam (B) (see FIGS. 1 and 2).

EXAMPLE 2

(C)

84 parts by weight of high-pressure polyethylene (melt index about 3.5, measured according to DIN 53 735 190/2

Figure 3:
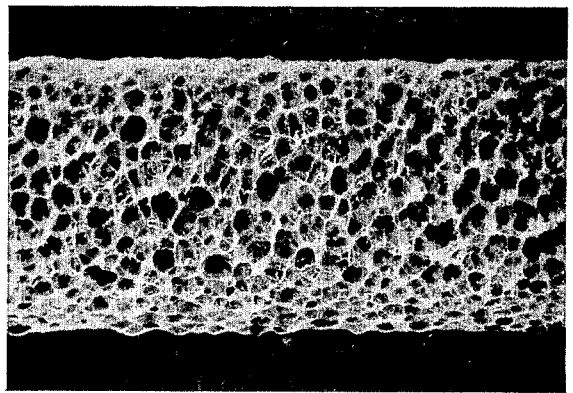
Figure 4:
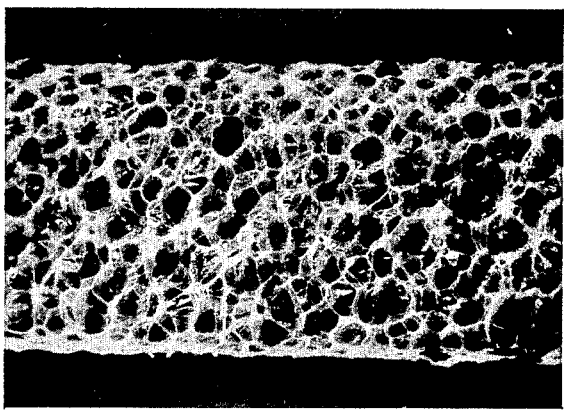

1 part by weight of dicumyl peroxide 15 parts by weight of azodicarbonamide 10 parts by weight of a copolyester of 23 parts by weight of sebacic acid, 19 parts by weight of terephthalic acid, 17 parts by weight of isophthalic acid, 41 parts by weight of 1,4-butanediol, average molecular weight about 20,000, flow temperature 100° C., measured according to the ring and ball method (ASTM D 36)

were processed, as described in Example 1, into a sheet having a thickness of 2.5 mm. and then into a foam sheet having a thickness of 8 mm., i.e. foam (C).* The reduction in cell size can be seen from FIGS. 3 and 4 when foam (C) is compared to foam (B) produced in the same way but without the addition of the copolyester.

* The temperature program of the canal was 185° C./235° C./228° C. (insertion zone → end zone) and the velocity of conveyor belt was 2.1 m/min.

EXAMPLE 3

Foam (D)

84 parts by weight of a copolymer of ethylene and vinyl acetate (weight ratio 92:8, melt index about 5, measured per DIN 53 735, 190/2)

1 part by weight of dicumyl peroxide 15 parts by weight of azodicarbonamide 3 parts by weight of the same adipic -butylene glycol ester used in Example 1 were processed, as described in Example 1, into a sheet having a thickness of about 3.5 mm. and then into a foamed sheet having a thickness of 11 mm. The temperature program of the canal was 183° C./228° C./225° C. (insertion zone → end zone) and the velocity of conveyor belt was 1.7 m/min.

Foam (E)

Figure 5:
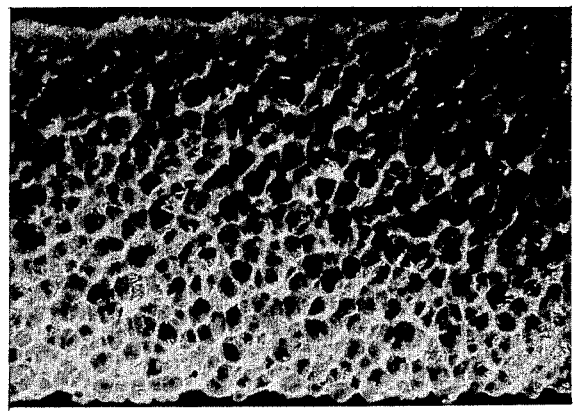
Figure 6:
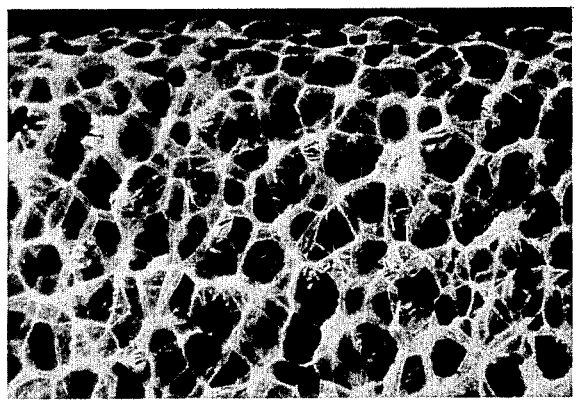

For comparison purposes, a foam was produced as described under Foam (D), but without the addition of adipic acid-butylene glycol ester. The refinement in cell structure is shown in FIGS. 5 and 6.

Since the thickness of the manufactured foam sheet affects the cell size, the weight-wise composition of the basic recipe and the thickness of the produced sheets were kept at a constant value in the comparative example. Thus, an absolute comparability of the cell sizes among one another is provided. The thicknesses of the foams illustrated in the pictures were as follows:

|  |  |  | Average Diameter of the Pores |
|---|---|---|---|
| Foam (A) | (Example 1) | 18 mm. | 1.3 mm. |
| Foam (B) | (Comparative Example) | 18 mm. | 1.8 mm. |
| Foam (C) | (Example 2) | 8 mm. | 0.6 mm |
| Foam (B') | (Comparative Example) | 8 mm. | 0.9 mm. |
| Foam (D) | (Example 3) | 11 mm. | 0.9 mm. |
| Foam (E) | (Comparative Example) | 11 mm. | 1.5 mm. |

It will be appreciated from the foregoing examples that the cell size of the resulting foam is substantially reduced. Foams with pore regulators have average pore diameters that are generally about 10–90% higher than the average pore diameters of foams prepared with pore regulators, i.e. the average diameter of pores of foam E is 67% higher than the average diameter of pores of foam D.

Also, the flow points and/or melting ranges of the pore regulators are usually in the range of from <100° to 280° C. The pore regulators are to be elected in such a way that their flow points and/or melting ranges are not higher than the material temperature necessary to produce the preformed, not yet foamed, sheet or slab and not higher than the decomposition temperature of the peroxyd used. The pore regulators can be solid or liquid at room temperature. The crosslinking and expansion, i.e. foaming of the slab or sheet of resin containing the organic peroxide, the blowing agent and the pore regulator is generally effected at >100° to 280° C., preferably 130° to 250° C. under atmospheric pressure. The foamed slabs or sheets of the invention are much less stiff and more resilient than the foams that were produced without a pore regulator. Such less stiff and more resilient foams are desired for example for production of life belts, upholstery materials and the like. Another advantage of the invention is the better smoothness of the foamed products.

What is claimed is:

1. A process for the production of a continuous foam sheet by thermal crosslinking and foaming of a synthetic resin of a polyolefin shaped into a sheet or panel and containing an organic peroxide, and a blowing agent, which comprises adding to and finely distributing in the synthetic resin of a polyolefin and containing an organic peroxide and a blowing agent at below the decomposition temperature of the peroxide and of the blowing agent in the thermoplastic range, at least one pore regulator selected from the group consisting of oligomeric and polymeric saturated dicarboxylic acid esters and dicarboxylic acid ester mixtures having a flow point or melting range below the decomposition temperature of the peroxide and of the blowing agent, said dicarboxylic acid esters or dicarboxylic acid ester mixtures containing, as the diol component, residues of one or more saturated diols of the formula —O—R'—O—, wherein R' represents an alkylene residue of 2-8 carbon atoms in the chain or an alkylene residue of 2-8 carbon atoms in the chain having one or more cycloalkyl groups or one or more alkyl groups of 1-3 carbon atoms.

2. A process according to claim 1, wherein the dicarboxylic acid esters or dicarboxylic acid ester mixtures contain, as the acid component, at least one of
 (a) residues selected from the group consisting of aromatic dicarboxylic acids and the polyester-forming derivatives thereof; and
 (b) residues of saturated dicarboxylic acids of the formula —OOC—R—COO— wherein R represents an unsubstituted or alkyl substituted cycloalkylene residue, or an alkylene residue of 2-8 carbon atoms in the chain or an alkylene residue of 2-8 carbon atoms in the chain having one or more alkyl substituents of 1-3 carbon atoms, and residues of the polyester-forming derivatives thereof.

3. A process according to claim 1, wherein the at least one pore regulator is utilized in amounts of 0.5-25 parts by weight, based on 100 parts by weight of the total weight of the polyolefin, the organic peroxide, and the blowing agent.

4. A process according to claim 1, wherein polyethylene is utilized as the polyolefin.

5. A process according to claim 1, wherein the at least one pore regulator has carboxy or hydroxy terminal groups.

6. A process according to claim 5, wherein the carboxy or hydroxy end groups are at least partially reacted with or monofunctional alcohols or monofunctional carboxylic acids, respectively.

7. A process according to claim 1, wherein the sheet also contains at least one additive selected from the group consisting of antioxidants, light protection agents, pigments, fillers, flame retardants, antistatic agents, and mold release agents.

8. A process according to claim 2, wherein the chain of the diol components is interrupted by at least one oxygen atom or unsubstituted or alkyl substituted cycloalkylene group.

9. A process according to claim 4, wherein high-pressure polyethylene is utilized as the polyethylene.

10. A process according to claim 4, wherein the at least one pore regulator is utilized in amounts of 1-15 parts by weight, based on 100 parts by weight of the total weight of the polyolefin, the organic peroxide, and the blowing agent.

11. A process according to claim 2, wherein the acid component (a) is residues of at least one of the group consisting of phthalic acid, isophthalic acid, terephthalic acid, naphthalenedicarboxylic acid, the anhydrides and lower alkyl and diphenyl esters of these acids, and nuclear-substituted derivatives of these acids.

12. A process according to claim 1, wherein the acid component (a) is residues of at least one of the group consisting of terephthalic acid, isophthalic acid, phthalic acid, and phthalic anhydride.

13. A process according to claim 2, wherein the acid component (b) is residues of at least one of the group consisting of succinic anhydride, dimethylmalonic acid, α,α'-dimethylglutaric acid, adipic acid, azelaic acid, sebacic acid, hexahydrophthalic acid, hexahydroisophthalic acid, hexahydroterephthalic acid, and anhydrides of these acids.

14. A process according to claim 8, wherein the diol component is residues of at least one of the group consisting of ethylene glycol, 1,2-propanediol, 1,3-propanediol, 1,2-butanediol, 1,4-butanediol, 2,2-dimethylpropanediol, 2,5-hexanediol, 1,6-hexanediol, 4,4'-dihydroxy-2,2-dicyclohexylpropane, 1,2- or 1,4-cyclohexanediol, dimethylcyclohexanediol, dimethylolcyclohexane, 2,2,4-trimethyl-1,3-pentanediol, diethylene glycol and triethylene glycol.

15. A process according to claim 1, wherein the synthetic resin of a polyolefin is selected from the group consisting of high-pressure polyethylene, intermediate pressure polyethylene, low-pressure polyethylene, copolymers consisting essentially of ethylene, and mixtures thereof.

16. A process according to claim 15, wherein said synthetic resin of a polyolefin is in a mixture with at least one of the group consisting of elastomers and synthetic resins.

17. A process according to claim 15, wherein the copolymers are selected from the group consisting of ethylene-propylene copolymers, ethylene-butylene copolymers, copolymers from ethylene and vinyl acetate and the derivatives thereof, and copolymers of ethylene and acrylic or methacrylic acid and the derivatives thereof.

18. A process according to claim 16, wherein the elastomers and synthetic resins are selected from the group consisting of natural rubber, ethylene-propylene elastomer, butyl rubber, polyisobutylene, styrene-butadiene elastomer, polybutadiene, polybutene, polyisoprene, acrylonitrile-butadiene-styrene, polystyrene, polypropylene, chlorinated polyethylene, and sulfochlorinated polyethylene.

19. A process according to claim 1, wherein the flow point or melting range is between 100° and 280° C.

20. A process for producing a continuous foam sheet of a synthetic resin of polyolefin which comprises admixing an organic peroxide, a blowing agent, and at least one pore regulator with the synthetic resin, finely distributing said peroxide, blowing agent, and at least one pore regulator within said resin at a temperature below the respective decomposition temperatures of the peroxide and of the blowing agent in the thermoplastic range, shaping the resulting admixture into a sheet or panel and thereafter effecting thermal crosslinking and foaming of the resin; said at least one regulator being selected from the group consisting of an oligomeric or polymeric saturated dicarboxylic acid ester or a mixture of such esters having a flow point or melting range below the respective decomposition temperatures of the peroxide and of the blowing agent, said dicarboxylic acid esters or acid ester mixtures containing, as the diol component, residues of one or more saturated diols of the formula —O—R'—O—, wherein R' represents an alkylene residue of 2-8 carbon atoms in the chain or an alkylene residue of 2-8 carbon atoms in the chain substituted by one or more cycloalkyl groups or one or more alkyl groups of 1-3 carbon atoms.

21. A process according to claim 20, wherein at least one pore regulator is at least one ester of at least one dicarboxylic acid selected from the group consisting of an aromatic dicarboxylic acid, a polyester-forming derivative of said aromatic dicarboxylic acid, and a saturated dicarboxylic acid of the formula HOOC—R—COOH, wherein R represents an unsubstituted or alkyl-substituted cycloalkylene residue or an alkylene residue containing 2-8 carbon atoms in a chain, or an alkylene residue of 2–8 carbon atoms in a chain having one or more alkyl substituents of 1–3 carbon atoms; and a diol selected from the group consisting of a saturated diol of the formula HO—R—OH, wherein R represents an alkylene residue of from 2–8 carbon atoms in a chain or an alkylene residue of from 2–8 carbon atoms in a chain substituted by at least one alkyl group of from 1–3 carbon atoms.

22. The process according to claim 20, wherein the at least one pore regulator is at least one ester of at least one dicarboxylic acid selected from the group consisting of an aromatic dicarboxylic acid and a polyester-forming derivative of said dicarboxylic acid, wherein the aromatic dicarboxylic acid is an acid selected from the group consisting of phthalic acid, isophthalic acid, terphthalic acid, and naphthalenedicarboxylic acid and the polyester forming derivative is selected from the group consisting of the anhydrides, the lower alkyl esters or nuclear-substituted derivative wherein the substituent is selected from the group consisting of lower alkyl and halogen groups.

23. A process according to claim 7, wherein the chain of the saturated diols is interrupted by at least one oxygen atom or unsubstituted or alkyl substituted cycloalkylene group.

24. A process according to claim 23, wherein the diol is at least one of the group consisting of ethylene glycol, 1,2-propanediol, 1,3-propanediol, 1,2-butanediol, 1,4-butanediol, 2,2-dimethylpropanediol, 2,5-hexanediol, 1,6-hexanediol, 4,4'-dihydroxy-2,2-dicyclohexylpropane, 1,2- or 1,4-cyclohexanediol, dimethylcyclohexanediol, dimethylolcyclohexane, 2,2,4-trimethyl-1,3-pentanediol, diethylene glycol and triethylene glycol.

* * * * *